(12) United States Patent
Wong et al.

(10) Patent No.: US 9,321,021 B2
(45) Date of Patent: Apr. 26, 2016

(54) CONVERTING NANOPARTICLES IN OIL TO AQUEOUS SUSPENSIONS

(75) Inventors: Michael S. Wong, Houston, TX (US); Hitesh Ghanshyam Bagaria, Houston, TX (US); Gautam Chandrakanth Kini, Houston, TX (US); Wen Yin Lynn Ko, Taichung (TW)

(73) Assignee: William Marsh Rice University, Houston, TX (US)

( * ) Notice: Subject to any disclaimer, the term of this patent is extended or adjusted under 35 U.S.C. 154(b) by 1474 days.

(21) Appl. No.: 13/056,858

(22) PCT Filed: Jul. 30, 2009

(86) PCT No.: PCT/US2009/052312
§ 371 (c)(1),
(2), (4) Date: May 24, 2011

(87) PCT Pub. No.: WO2010/019390
PCT Pub. Date: Feb. 18, 2010

(65) Prior Publication Data
US 2011/0220839 A1    Sep. 15, 2011

Related U.S. Application Data

(60) Provisional application No. 61/088,225, filed on Aug. 12, 2008.

(51) Int. Cl.
*B01J 13/00* (2006.01)
*B01F 17/00* (2006.01)

(52) U.S. Cl.
CPC ......... *B01F 17/0085* (2013.01); *B01J 13/0008* (2013.01); *B01J 13/0039* (2013.01); *Y10S 977/773* (2013.01); *Y10S 977/786* (2013.01)

(58) Field of Classification Search
CPC ............... B01J 13/0056; B01J 13/0039; B01J 2531/985; B01J 13/0008; B01J 13/0086; B01J 2531/98; H01L 31/035218; B01F 17/0085; C09K 11/00; C09K 11/02; Y10S 977/786; Y10S 977/778; Y10S 977/773; Y10S 977/963
USPC ......................................................... 516/78
See application file for complete search history.

(56) References Cited

U.S. PATENT DOCUMENTS

| 5,147,841 | A  | * | 9/1992  | Wilcoxon ...................... 516/33 |
| 2003/0213402 | A1 | * | 11/2003 | Magdassi et al. .......... 106/31.25 |
| 2005/0019901 | A1 | * | 1/2005  | Matveeva et al. .......... 435/287.2 |
| 2005/0152832 | A1 | * | 7/2005  | Ying et al. ..................... 423/600 |
| 2006/0042417 | A1 | * | 3/2006  | Gash et al. ...................... 75/415 |
| 2006/0083694 | A1 | * | 4/2006  | Kodas et al. ..................... 424/46 |
| 2006/0084705 | A1 | * | 4/2006  | Caruso et al. ................... 516/20 |

(Continued)

OTHER PUBLICATIONS

Yang et al., "Synthesis of Ultrasensitive Magnetic Resonance Contrast Agents for Cancer Imaging Using PEG-Fatty Acid", Chem. Mater., 2007, 19 (16), pp. 3870-3876 (Publication Date (Web): Jul. 17, 2007).*

(Continued)

*Primary Examiner* — Daniel S Metzmaier
(74) *Attorney, Agent, or Firm* — Boulware & Valoir

(57) ABSTRACT

An improved process for converting an oil suspension of nanoparticles (NPs) into a water suspension of NPs, wherein water and surfactant and a non-surfactant salt is used instead of merely water and surfactant, leading to greatly improved NP aqueous suspensions.

2 Claims, 14 Drawing Sheets

Schematic 2: Inventive method of phase-transferring NPs from oil to salt water

(56) References Cited

U.S. PATENT DOCUMENTS

2007/0178308 A1* 8/2007 Furusawa et al. ............ 428/403
2009/0004098 A1* 1/2009 Schmidt et al. ................ 516/9

OTHER PUBLICATIONS

Adler et al, "Correlation of Particulate Dispersion Stability with the Strength of Self-Assembled Surfactant Films", Langmuir 2000, 16, 7255-7262.*

Li et al, "Single quantum dot-micelles coated with gemini surfactant for selective recognition of a cation and an anion in aqueous solutions", Sensors and Actuators B: Chemical, 134 (2008) 238-244 (Available online May 2, 2008).*

Somasundaran et al, Chpt "14—Colloid Systems and Interfaces— Stability of Dispersions Through Polymer and Surfactant Adsorption", Handbook of Surface and Colloid Chemistry, ed. K.S. Birdi, pp. 559-560, 575-587 and 600-601.*

Zana et al, Alkanediyl-cu,o-bis(dimethylalkylammonium bromide) Surfactants. 1. Effect of the Spacer Chain Length on the Critical Micelle Concentration and Micelle Ionization Degree, Langmuir 1991, 7, 1072-1075.*

Tang, Z. Y., Kotov, N. A., One-dimensional assemblies of nanoparticles: Preparation, properties, and promise. Advanced Materials 2005, 17, (8), 951-962.

Shipway, A. N., et al., Nanoparticle arrays on surfaces for electronic, optical, and sensor applications. ChemPhysChem 2000, 1, (1), 18-52.

Bruchez, M., et al., Semiconductor nanocrystals as fluorescent biological labels. Science 1998, 281, (5385), 2013-2016.

Michalet, X., et al, Quantum dots for live cells, in vivo imaging, and diagnostics. Science 2005, 307, (5709), 538-544.

Dobson, J., Gene therapy progress and prospects: magnetic nanoparticle-based gene delivery. Gene Therapy 2006, 13, (4), 283-287.

Giepmans, R N. G. et al., Correlated light and electron microscopic imaging of multiple endogenous proteins using Quantum dots. Nature Methods 2005, 2, (10), 743-749.

Aldana, J., et ai., Photochemical instability of CdSe nanocrystals coated by hydrophilic thiols. Journal of the American Chemical Society 2001, 123, (36), 8844-8850.

Talapin, D. v., et al., Highly luminescent mono disperse CdSe and CdSe/ZnS nanocrystals synthesized in a hexadecylamine-trioctylphosphine oxidetrioctylphospine mixture. Nano Letters 2001, 1, (4), 207-211.

Fan, H. Y., et al., Surfactant-assisted synthesis of water-soluble and biocompatible semiconductor quantum dot micelles. Nano Letters 2005, 5, (4), 645-648.

Fan, H. Y., et al., Self-assembly of ordered, robust, three-dimensional gold nanocrystal/silica arrays. Science 2004, 304, (5670), 567-571.

Dubertret, B., et al., In vivo imaging of quantum dots encapsulated in phospholipid micelles. Science 2002, 298, (5599), 1759-1762.

Li, H. R, et al., Gemini surfactant for fluorescent and stable quantum dots in aqueous solution. Nanotechnology 2007, 18, (20).

Bagaria, H. G., et al., Electrolyte Solutions Improve Nanoparticle Transfer from Oil to Water. The Journal of Physical Chemistry C 2010, 114, 19901-19907.

Zhang, Y. J., Cremer, P. S., Interactions between macromolecules and ions: the Hofmeister series. Current Opinion in Chemical Biology 2006, 10, (6), 658-663.

* cited by examiner (i)　　　　(ii)　　　　(iii)

Schematic 1: Conventional method of phase-transferring NPs from oil to plain water Schematic 2: Inventive method of phase-transferring NPs from oil to salt water

CONVERTING NANOPARTICLES IN OIL TO AQUEOUS SUSPENSIONS

CROSS-REFERENCE TO RELATED APPLICATIONS

This application is a 35 U.S.C. Section 371 of PCT/US09/052312, filed Jul. 30, 2009 which claims priority to U.S. Provisional Application No. 61/088,225, filed Aug. 12, 2008 and both are incorporated herein by reference in their entirety.

FEDERALLY SPONSORED RESEARCH STATEMENT

This invention was made with government support under Grant No. CBET 0652073 awarded by the National Science Foundation. The government has certain rights in the invention.

REFERENCE TO MICROFICHE APPENDIX

Not applicable.

FIELD OF THE INVENTION

The invention generally relates to an improved process for converting an oil suspension of nanoparticles (NPs) into a water suspension of NPs. Conventional methods of preparing NP dispersions focus on transferring NPs from oil to water using a surfactant—this is referred to as phase-transfer. The novelty of the process described herein is that salt-containing water is used instead of plain water, leading to the desired improvement in the NP suspensions. The improvement comes in the form of more stable aqueous NP suspensions, wherein the size and functionality of NPs (luminescence, magnetization, electrical properties etc.) are retained or even enhanced.

BACKGROUND OF THE INVENTION

NPs have found several applications due to their high specific surface area and unique optical, electrical and magnetic properties in fields such as medical diagnostics, drug delivery, foods, energy and catalysis, combinatorial libraries, semiconductors and electronics.[1-6] A key challenge in phase-transfer of NPs involves the prevention of drastic alterations to the functional properties of NPs while in aqueous phase. A well documented example is the degradation in optical properties of CdSe quantum dots (QD) in water, brought about by water-induced fluorescence quenching. Methodologies to prevent QD surfaces from coming in contact with water include the growth of physical barriers such as a shell (core-shell quantum dots) or the use of surfactant and polymeric systems to disperse and protect the NPs from interactions with water.[7,8]

Previous groups have employed microemulsion/emulsion/surfactant routes to phase-transfer NPs to water.[9-12] Fan et al. (2005) discuss a process to phase-transfer NPs dissolved in chloroform by formulating an oil in water microemulsion with chloroform as oil and cetyl trimethylammonium bromide (CTAB) as surfactant, wherein chloroform is evaporated by heating the microemulsion. This process gives aqueous dispersions of NPs with high stability, but results in drastic lowering in functional properties of NPs, specifically luminescence.[10]

Dubertret et al. (2002) report successful dispersion of single quantum dots in water using twin-tailed surfactants such as 1,4-Bis(2-ethylhexyl) sodium sulfosuccinate (Aerosol OT or AOT).[11] In their proposed route, quantum dots were dissolved in chloroform to which AOT was added, and the chloroform was evaporated to leave behind a residue. The residue was then heated at 80° C. after which 1 mL of water was added to give a stable clear dispersion of quantum dots in water. When the procedure discussed above was repeated with addition of salt (unspecified composition) in lieu of pure water, the resulting quantum dot suspensions were reported to be unstable.[11] Thus, Dubertret teaches away from using salt to improve phase transfer.

Li et al. (2007) report phase-transfer of CdSe/ZnS core-shell quantum dots from chloroform to water. CdSe/ZnS core-shell quantum dots were solubilized in chloroform upon which the mixture was transferred to a solution of Gemini 12-4-12 surfactant that resulted in the formation of oil-in-water microemulsion. The core-shell quantum dots were phase-transferred to water by evaporating chloroform at 50° C. for 30 minutes. Photoluminescence studies revealed an increase in intensity of core-shell quantum dots in aqueous phase over those in chloroform and the phase transferred NP dispersion was found to be stable. The authors also mention in the paper that the NP dispersions were stable even after two months, in terms of photoluminescence intensities. No photoluminescence intensities values measured after 2 months were published in the paper, however, and it is important to note that the reported luminescence values were for a CdSe—ZnS core-shell structure,[12] not a naked QD.

Schematic 1, displayed in FIG. 20, summarizes current methods to phase-transfer NPs, wherein NPs present in oil are added to water that contains a dispersing/stabilizing agent (surfactant). Surfactants have "oil-loving" (hydrophobic) and "water-loving" (hydrophilic) groups in its chemical structure and exist as structures called "micelles" in water. The hydrophilic ends of the micellar structure face water, whereas the hydrophobic groups are shielded from water and are located in the interior of the micelle.[13] When oil is added to water containing surfactant micelles, the surfactant molecules partition to the interface of oil and water so as to disperse oil in water. These dispersions are then heated to evaporate or "boil-off" the oil. Consequently, NPs are contained within the hydrophobic part of the micelle and the hydrophilic portion disperses them in water.

However, what is needed in the art are better methods to phase-transfer NPs to water without disturbing key properties of the nanoparticles.

SUMMARY OF THE INVENTION

We have found quite surprisingly that phase-transfer of NPs in water containing salt facilitates formation of compact surfactant micelles that helps improve NP dispersibility and retain their functionality over several weeks. Particularly noteworthy is the retention of functionality for the case of bare QDs and tetrapods in aqueous phase over time periods of several weeks. This has never been reported in previous literature, which focuses on protective core-shell structures to shield QD surfaces from coming in contact with water.

Schematic 2, displayed in FIG. 21, summarizes the method of the invention. The methodology to phase-transfer NPs is the same as described above, except that salt-containing water is used in the invention instead of plain water. An alternate method to phase-transfer NPs is by blending surfactants directly to oil containing NPs upon which, the mixture is added to salt-water or plain water and oil is evaporated. Even through this route, the benefits of NP phase-transferred in salt-containing water is significantly greater over phase-transfer in plain water.[14] Table 1 summarizes the benefits of the new process over existing NP phase-transfer methods.

TABLE 1

Benefits of new phase-transfer process over existing methods

| Route in Literature | Process Summary | System | Phase-transfer in Water | | Phase-transfer in Salt-Containing Water (Using newly proposed process) | |
|---|---|---|---|---|---|---|
| | | | Forms Dispersion? | Retains PL[+] in solution? | Forms Dispersion? | Retains PL in solution? |
| Fan et al. 2005, 2004 | Oil + NPs-add to surfactant solution in plain water, stir to form microemulsion, heat to evaporate oil and thus, form NP dispersion in water that are stabilized by surfactants | Oil-Chloroform, Surfactant-CTAB, NP-CdSe QDs | Yes, but all NPs crash out upon centrifugation (FIG. 1) | Poor PL | Yes, most NPs retained in solution upon centrifugation (FIG. 1) | High PL |
| Bagaria et al. 2009 [14] | Oil + NPs-add to surfactant solution in salt-containing water, form microemulsion, heat to evaporate oil and form NP dispersions. Alternately, Oil + NPs + Surfactant-add to salt-containing water to form microemulsion, heat to evaporate oil and thus, form NP dispersions | Oil-Hexane, Surfactant-Aerosol OT (AOT), NP-CdSe QD | Yes, but bulk of NPs crash out upon centrifugation (FIGS. 2, 3) | Poor PL (FIGS. 2, 3) | Yes, most NPs retained in solution upon centrifugation (FIGS. 2, 3) | High PL (FIGS. 2, 3) |
| Dubertret et al. 2002 | Oil + NP + Surfactant, heat to evaporate oil, add water or salt solution to disperse NP in water | Oil-Chloroform, Surfactant-AOT, NP-CdSe QD | No, all NPs crash out upon centrifugation (FIG. 4) | Poor PL | **Not applicable | Not applicable |
| Li et al. 2007 | Oil + NP + Surfactant, add to water to form emulsion, heat to evaporate oil and thus form NP dispersion in water stabilized by surfactant | Oil-Chloroform, Surfactant-Gemini 12-4-12, NP-CdSe/ZnS Core-Shell | Yes | Yes | To try | To try |

[+]PL = Photoluminescence
*Dubertret et al. (2002) make the case that when salt was added to the residue obtained by heating the oil-NP-surfactant blend, it gave unstable dispersions.
**NP phase transfer using the process by Dubertret et al. (2002) is compared with the phase transfer process developed by Wong and coworkers herein (refer to Bagaria et al. 2009 for further details)

Salts herein refer primarily to the salting-out variant (called salting-out electrolyte or water structure makers) that are known to have the following effects that prove useful in assisting NP phase-transfer.[15] These salts readily dissociate in water to yield anions and cations and are known to lower the critical micellar concentration (CMC, or concentration at which surfactants form micellar structures), resulting in the formation of compact micelles through a charge screening mechanism.[16]

The salt comprises a cationic portion selected from the group consisting of alkali, alkaline earth metal, sodium, potassium, magnesium, calcium, and quaternary ammonium and an anionic portion selected from the group consisting of halide, acetate, malate, fumarate, citrate, succinate, phosphate, polyphosphates, hypochlorite, perchlorite, carbonate, bicarbonate, bisulphite, sulphite, sulphonate, and nitrate.

As an alternate to salting-out electrolytes, salting-in electrolytes or water structure breakers can be used to phase-transfer NPs. These salts do not dissociate in water and are known to increase the CMC of surfactants. Examples of such salts include (but is not restricted to) are urea, guanidium chloride, 1-4 dioxane and the like. However, they can still facilitate compact micelle formation from charge screening. Even here, the NP dispersibility is better than when phase-transfer is carried out in plain water. Hence, oil-containing NPs in the new procedure are contained in smaller and more compact surfactant micelles than those formed in plain water. As a consequence, NP dispersibility upon evaporation of oil improves with superior retention in NP properties.

The temperature at which phase-transfer is carried out is typically high—above the boiling point of the organic solvent, but below that of water. This allows complete evaporation of oil to give NP dispersions in water that could be directly applicable in biological, health-care, pharmaceutical and food related fields, where the presence of oil is undesirable. At this high temperature, the solubility of surfactants in water is very high (called the Kraft temperature in literature for ionic or charged surfactants). Hence, their ability to form compact micelles in order to accommodate introduced oil is lower. Salts of the salting-out variety overcome this problem, wherein at appropriate concentrations they reverse the solubility trends to make surfactants available for stabilizing NPs during high temperature phase-transfer. This is facilitated by the salt disrupting the hydrogen bonding network of water with surfactants.[16] In addition to reversing solubility trends of ionic surfactants, salts also enhance compact micelle formation through a charge screening mechanism. Addition of salt, by making surfactants available for NPs, also increases the fraction of particles that get transferred from oil to water.

Three things should be noted. First, phase-transfer of NPs may be carried out at room temperature, but is preferably carried out at temperatures above the boiling point of oils and below that of water to be directly applicable in the pharmaceutical and food-related sectors. Second, alcohols or amines are sometimes required to be added in conjunction with salts to create a stable NP dispersion. Alcohols and amines are known to enhance the compactness of surfactant films by promoting hydrophobic interactions between surfactant monomers and through dissolution of liquid crystalline micelles of surfactants. Finally, in addition to the procedure described above, it is noteworthy that surfactants could be initially mixed with the oil-NP blend instead of being present in water or salt-containing water. There are slight differences in the NP phase-transfer trends, but the benefits of NP phase-transfer in salt-containing water is still significantly greater over phase-transfer in plain water.

Addition of salt sometimes results in the formation of liquid crystalline surfactant aggregates that may make the dispersion appear turbid. It may be desirable to remove these aggregates from the NP dispersion for certain applications. In such cases, the removal of aggregates may be easily performed either by centrifugation of the NP dispersion or by passing the phase-transferred NPs through an appropriate filtration device leading to clear NP dispersions. Alternatively, the liquid crystalline phases may be dissolved by addition of alcohols or amines.

Phase-transfer by this newly proposed method results in dispersions that have following features: (1) High stability of NPs from aggregation for several weeks/months, and (2) Retention in functional properties of NPs for several weeks/months. Stability from aggregation and retention of NP functionality is significantly better by this route when compared to dispersions obtained by conventional methods that phase-transfer NPs to water.

The steps are generally described as follows:

1. Dissolve NPs into oils having boiling points lower than that of water, such as hexane or chloroform.

2. Prepare a surfactant solution in water/salt-containing water such that the concentration of the surfactant is above the CMC. Add the NP containing oil blend (as prepared in step 1) to the surfactant solution and stir the resulting dispersion (called Oil-in-Water (O/W) emulsion) for 1 hour using a magnetic stirrer. Heat the emulsion in a water bath for 20-30 minutes, at a temperature above the boiling point of the oil. Cool the resulting solution so as to form the NP dispersion in water.

3. An alternate procedure would be to add surfactant to the NP containing oil blend to form a NP-oil-surfactant mix. Add water to this mixture to form Water-in-Oil (W/O) microemulsion. Add a dosed amount of microemulsion to water/salt-containing water such that the surfactant concentration is above the CMC, and stir the solution for 1 hour so as to form an emulsion. Heat the emulsion in a water bath for 20-30 minutes, at a temperature above the boiling point of the oil if it is desired to remove the oil. Cool the resulting solution so as to form the NP dispersion in water.

4. Another alternative would be to add surfactant to the NP containing oil blend to form a NP-oil surfactant mix. Add a dosed amount of this NP-oil surfactant mix to water/salt-containing water such that the surfactant concentration is above the CMC, and stir the solution for 1 hour so as to form an emulsion. Heat the emulsion in a water bath for 20-30 minutes at a temperature above the boiling point of the oil. Cool the resulting solution so as to form the NP dispersion in water.

Other possible variations are described in the following sections.

DETAILED DESCRIPTION OF THE INVENTION

Figure 1:
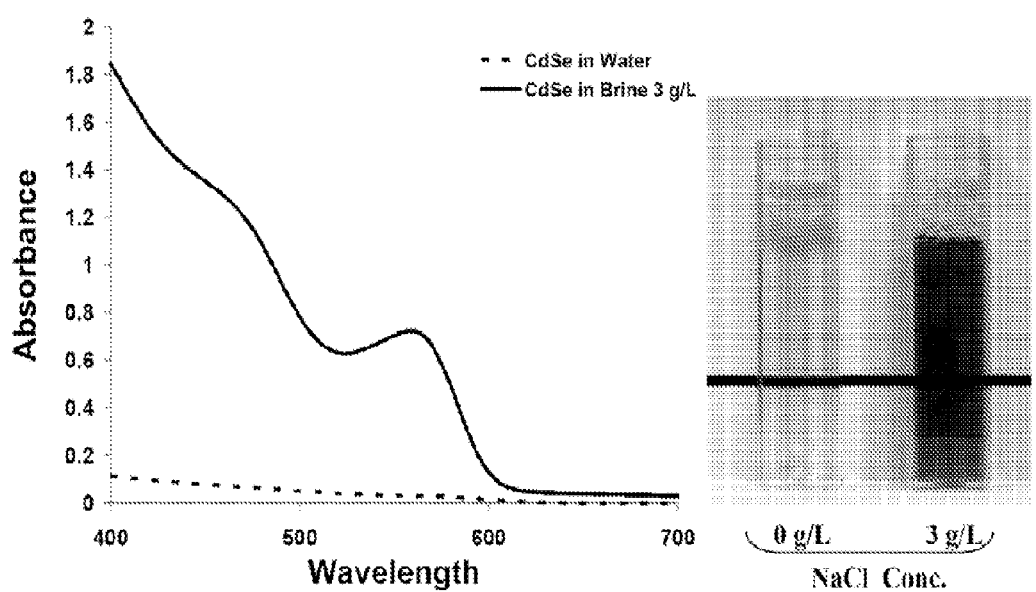
FIG. 1: UV-Vis spectra (left) of CdSe NPs phase transferred in water and 3 g/L NaCl solution with CTAB as the surfactant, and photographs (right) of these samples. Both samples were centrifuged at 9000 rpm for one hour after centrifugation.
Figure 2:
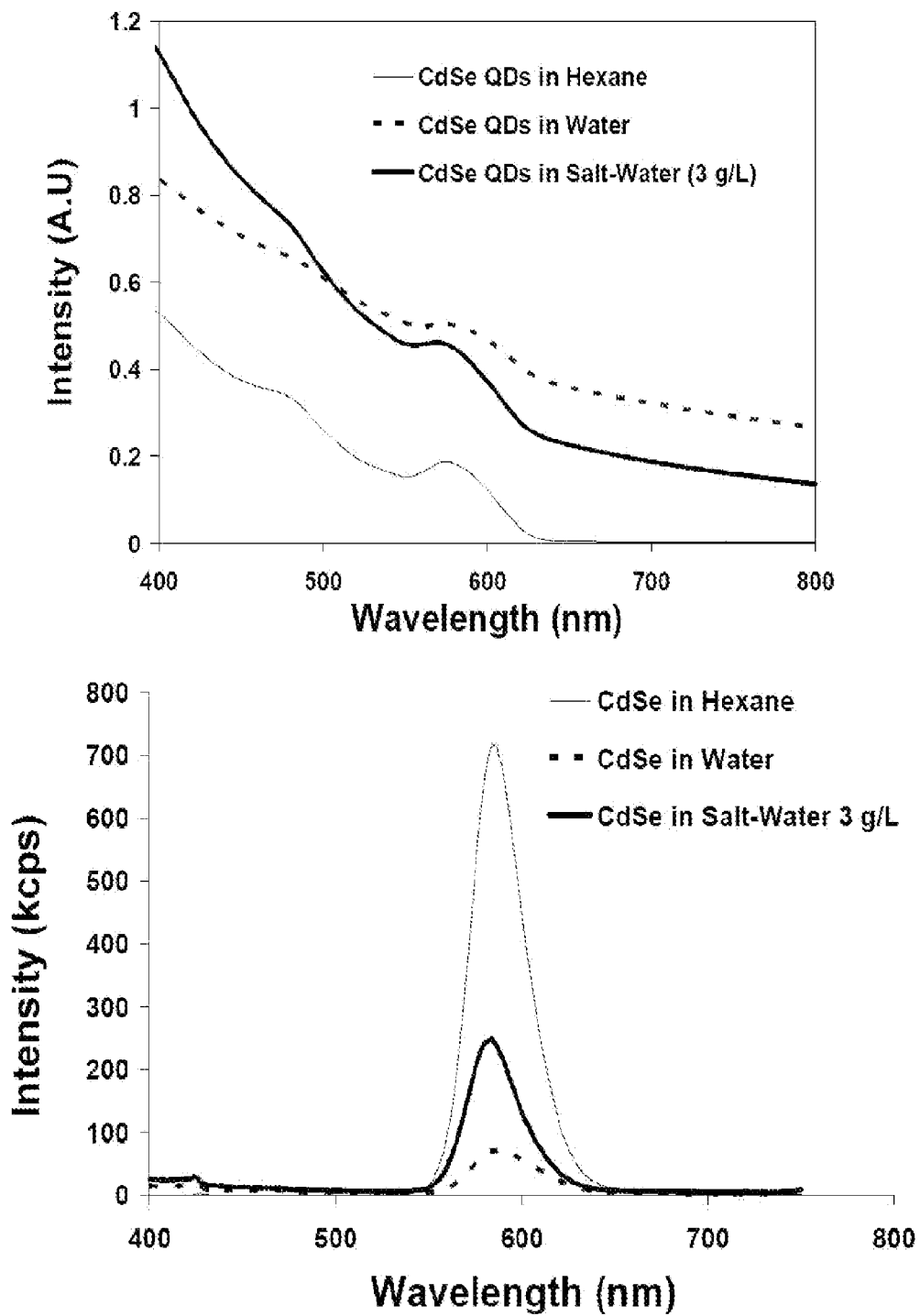
FIG. 2: UV-Vis absorbance spectra (top) and PL spectra (bottom) of spherical CdSe QDs transferred from hexane to water containing different levels of salt concentration (Salt=NaCl at 3 g/L, Surfactant=AOT).
Figure 3:
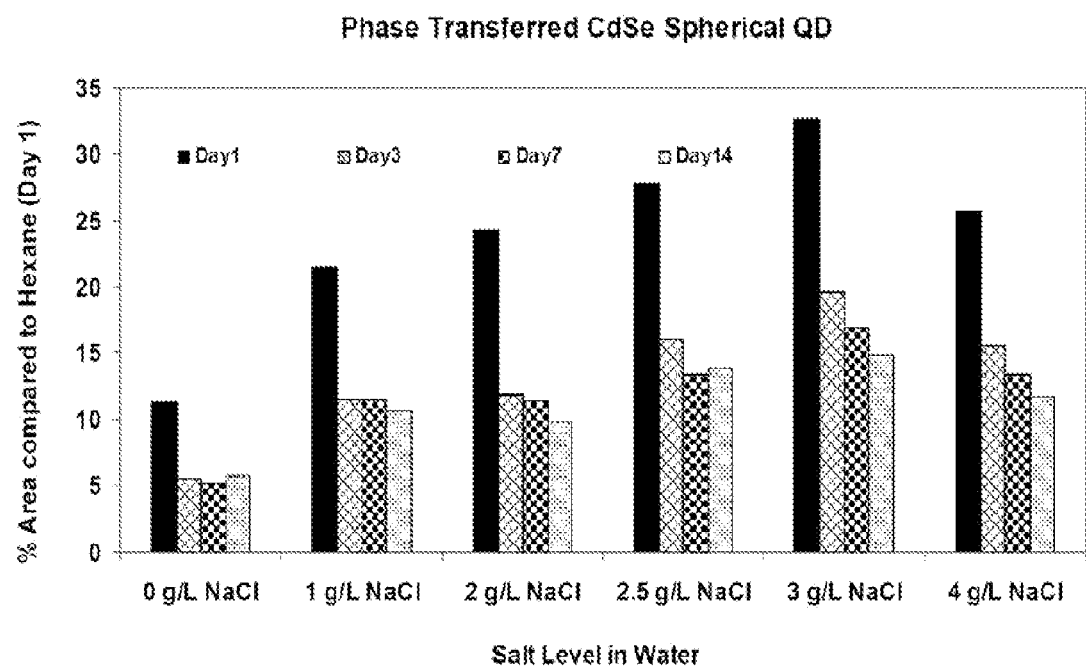
FIG. 3: % PL of spherical CdSe quantum dots as a function of time, when transferred from hexane to water containing different levels of salt concentration (Salt=NaCl, Surfactant=AOT).
Figure 4:
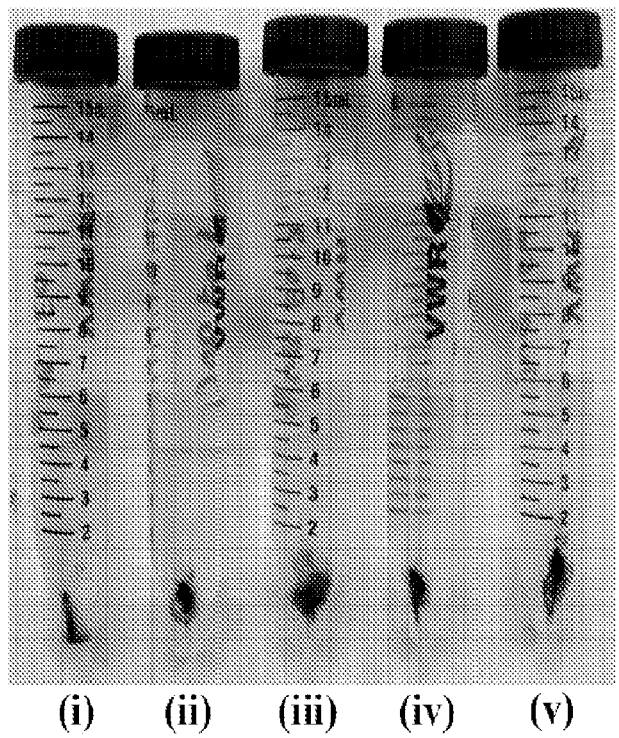
FIG. 4: Phase-transferred CdSe QDs using the procedure as described by Dubertret et al. (2002). A blend of chloroform-AOT-CdSe was heated to boil off chloroform. The resulting residue were added to (i) water and NaCl solutions (ii) 1 g/L (iii) 2.5 g/L (iv) 3 g/L and (v) 5 g/L and centrifuged at 9000 rpm for 1 hour. It is evident that the QDs crashed out for all cases indicating unstable dispersions.
Figure 5:
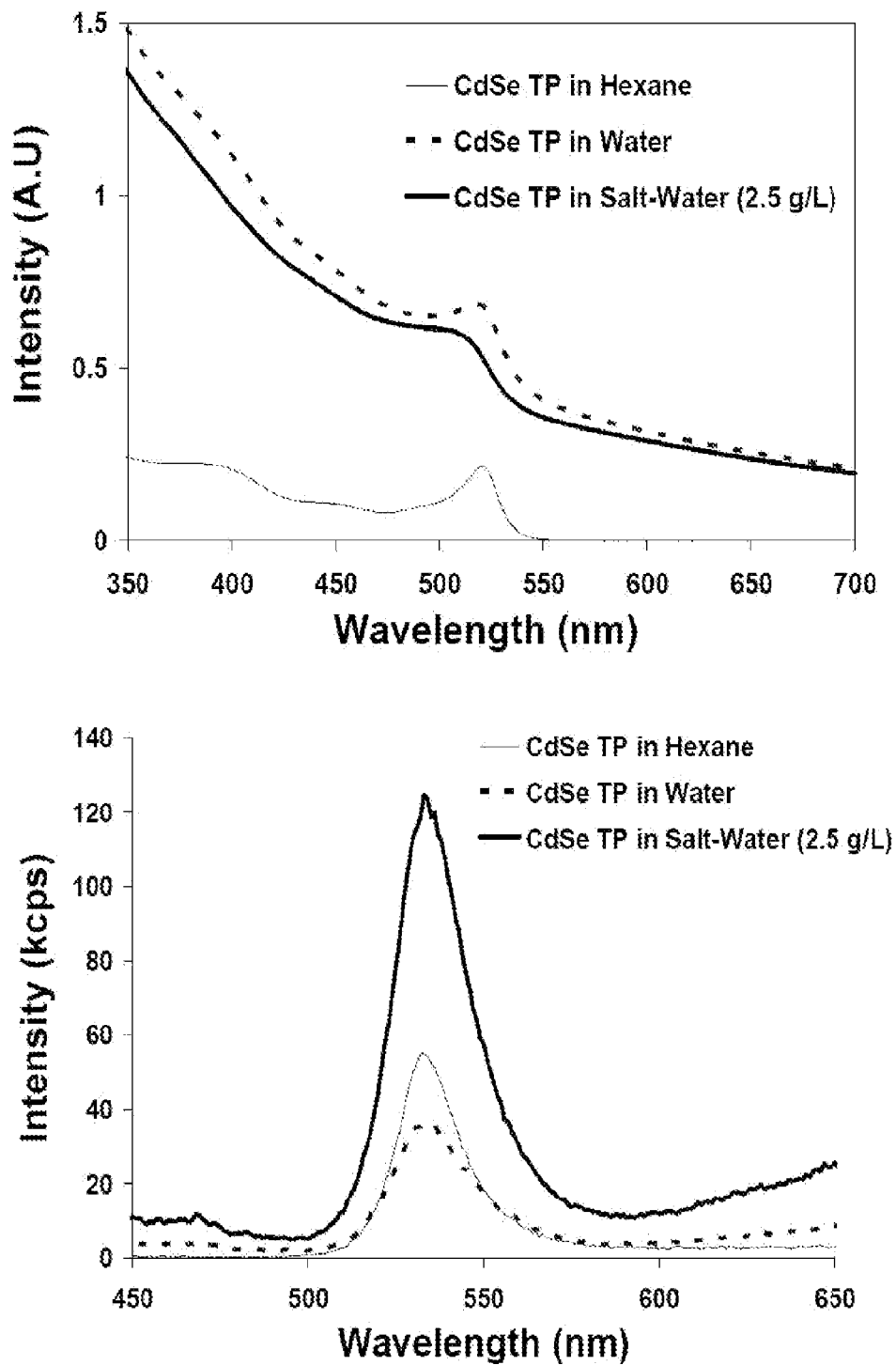
FIG. 5: UV-Vis absorbance spectra (top) and PL spectra (bottom) of CdSe tetrapods transferred from hexane to water containing different levels of salt concentration (Salt=NaCl at 2.5 g/L, Surfactant=AOT).
Figure 6:
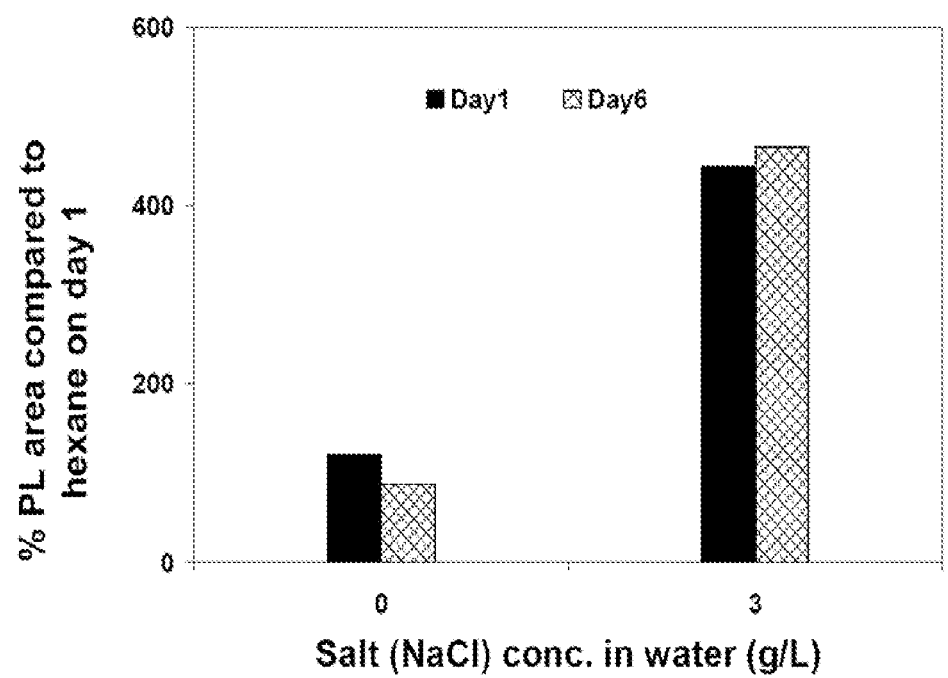
FIG. 6: % PL of CdSe tetrapods as a function of time, when transferred from hexane to water containing different levels of salt concentration (Salt=NaCl Surfactant=AOT).
Figure 7:
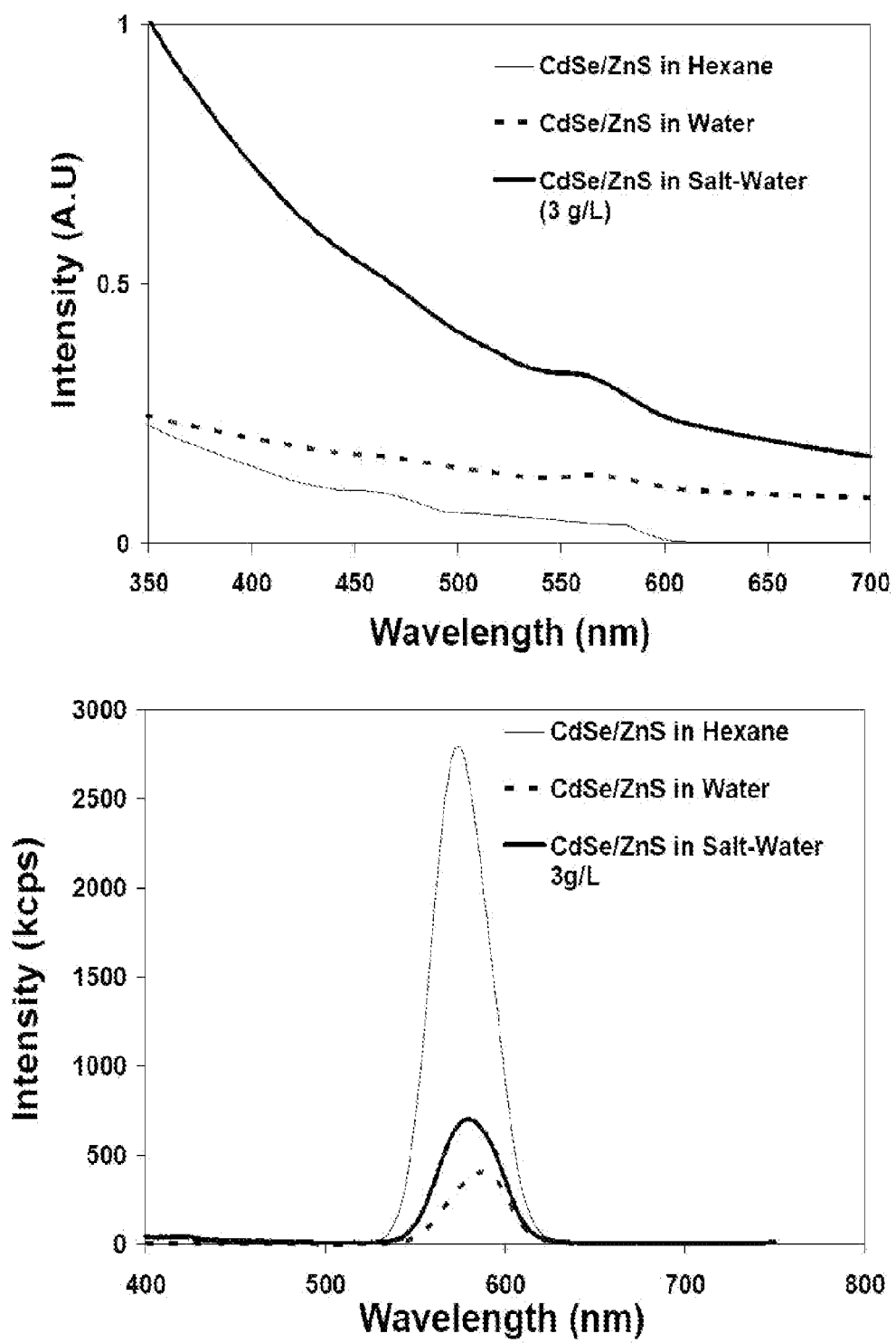
FIG. 7: UV-Vis absorbance spectra (top) and PL intensity spectra (bottom) of concentric spherical CdSe/ZnS core-shell quantum dots, transferred from hexane to water containing different levels of salt concentration (Salt=NaCl at 3 g/L, Surfactant=AOT).

The invention is a novel way of converting oil preparations of NPs to NPs dispersed in aqueous phase, using an additional ingredient—salt. Phase-transfer by the newly proposed method results in dispersions that have following features: (1) High stability of NPs from aggregation for several weeks/months, and (2) Retention in functional properties of NPs for several weeks/months. Stability from aggregation and retention of NP functionality is significantly better by this route when compared to dispersions obtained by conventional methods that phase-transfer NPs to water. Further, addition of salt also increases the fraction of particles that get transferred from oil to water.

A preferred salt for use in the invention is NaCl, but many other salts can be used, provided only that the salt function to lower the critical micellar concentration and to form compact micelles by charge screening of surfactants and does not otherwise alter the functionality of the NP, oil or surfactant. In preferred embodiments, the salt comprises a cationic portion selected from the group consisting of alkali, alkaline earth metal, sodium, potassium, magnesium, calcium, and quaternary ammonium and an anionic portion selected from the group consisting of halide, acetate, malate, fumarate, citrate, succinate, phosphate, polyphosphates, hypochlorite, perchlorite, carbonate, bicarbonate, bisulphite, sulphite, sulphonate, and nitrate. Salts that can be used include, but are not limited to, NaCl, KCl, $CaCl_2$, $MgCl_2$, $Na_2SO_4$, $K_2SO_4$, $CaSO_4$, $Na_3PO_4$, $K_3PO_4$, $Ca_3(PO_4)_2$, $Na_3$Citrate (sodium citrate), NaI, $Na_2HPO_4$ (disodium hydrogen phosphate), sodium acetate, EDTA and quarternary ammonium salts.

Preferred oils for use in the invention should be of low molecular weight so that the boiling point of the oil is lower than that of water. This constraint may be overcome, however, by a simple liquid extraction process of NPs from higher molecular weight oils, through the use of low molecular weight organic solvents with higher selectivity towards NPs. This requires an additional step in the phase-transfer process, however, and is less preferred. Alternately, for the case where the NPs are insensitive to high temperatures, the high molecular weight organic solvents can be boiled off and the NPs may be precipitated and/or dried before being redissolved into lower molecular weight solvents.

Additional variations in the invention include other types of anionic surfactants, such as, but not limited to, sodium dodecyl benzene sulfonate (SDBS), sodium dodecyl sulfate (SDS), sodium laureth sulfate (SLES) or anionic lipids like phosphatidic acid, phosphotidyl glycerol, phosphotidylinositol, etc., over and above herein demonstrated anionic aerosol-OT (AOT). Other categories of surfactants might also be employed in the invention, such as cationic (positively charged), nonionic (neutral), zwitterionic (positive and negative charge) and Gemini surfactants (2 regular surfactants linked together by spacer molecules). Examples of cationic surfactants include cetyl trimethyl ammonium bromide (CTAB), cetylpyridinium chloride (CPC), benzalkonium chloride (BAC), benzethonium chloride (BZT), amine and imidazoline salts such as primary, secondary and tertiary amine hydrochlorides and imidazoline hydrochlorides. Examples of nonionic surfactants include alkyl poly(ethylene oxide), copolymers of poly(ethylene oxide) and poly(propylene oxide), alkyl polyglucosides, alkyl phenol ethoxylate, polyoxyethylene esters of fatty acids, polyoxyethylene fatty acid amides, alkyl polysaccharides, ethoxylates of alkyl amine, castor oil, end capped synthetic alcohol, tallow amine and alkanol amine mercaptan. Examples of zwitterionic surfactants include dodecyl betaine, dodecyl dimethylamine oxide, docamidopropyl betaine and coco ampho glycinate.

Alcohols and amines that can be used to stabilize the dispersions include, but are not limited to, methanol, ethanol, isopropanol, butanol, monoethanol amine, diethanol amine, triethanol amine, ethylenediamine.

Other embodiments of the invention include phase-transfer NPs using bicontinuous/O/W microemulsions, O/W nanoemulsions/W/O nanoemulsions, in addition to herein demonstrated phase-transfer using W/O microemulsions. Also, W/O emulsions, water-in-oil-in-water (W/O/W) multiple emulsions or oil-in-water-in-oil (O/W/O) multiple emulsions can advantageously be employed.

In one embodiment, the NPs are solubilized in oil, surfactant added to the NP-oil blend and the resulting NP-oil surfactant blend is phase-transferred at high temperature in salt-containing water.

In another embodiment, the NPs are incorporated in microemulsions (W/O/bicontinuous/O/W) or in emulsions (W/O or O/W) or in multiple emulsions (W/O/W or O/W/O), the oil boiled off and the resulting NP surfactant mix phase-transferred in salt-containing water.

In another embodiment, the water may contain different types of surfactants or their mixtures, containing different types of salts such as sodium citrate, sodium iodide, sodium hydrogen phosphate, sodium acetate, sodium bromide etc. or their mixtures and under conditions of different pH and phase-transfer temperatures. Other salts included but not restricted to are weakly dissociating salts that act as salting-in electrolytes or water structure breakers, such as urea, guanidium chloride and 1-4 dioxane.

In another embodiment, the method involves phase-transfer of mixtures of different NPs from oil to water to produce dispersions with dual/multiple functionalities. For example, Au and Pd nanoparticles can be mixed in hexane and AOT and phase-transferred to salt containing water to result in assemblies of Au—Pd nanoparticles that can catalyze aqueous phase reactions. Alternately, the catalytic properties of Au or Pd could be combined with the optical properties of CdSe tetrapods or quantum dots to give novel NP assemblies with optically responsive catalytic properties.

In another embodiment, the method allows control over self-assembly of NP aggregates comprising of a single type of NP or mixtures of different NPs as a function of salt and/or alcohols. As an example, controlled crystallization of quantum dots could be obtained by phase-transferring them using oppositely charged surfactants (cationic and anionic) in salt water.

In another embodiment, the method allows control over self-assembly of NP aggregates comprising of a single type of NP or mixtures of different NPs and as a function of evaporation rates of oils that solubilize and host the NPs. The self-assembled aggregates obtained through procedures described above would potentially have novel optical, electrical, catalytic and magnetic properties.

In another embodiment, polymers are incorporated in phase-transfer solutions so as to add stability and functionality to NP dispersions and as avenues to create new structures such as functional/smart capsules, micro/nanowires etc. As an example, controlled crystallization of quantum dots or formation of NP assemblies/nanowires could be obtained by phase-transferring them using combinations of oppositely charged surfactants and polymers in salt water.

In another embodiment, the method allows the formation of NP dispersions stable across a wide range of ionic strength, pH and temperatures using mixed surfactants of ionic and non-ionic types, for high ionic-strength biological applications and as possible hydrocarbon/oil/gas sensing agents in hydrocarbon reservoirs.

Example 1

This example demonstrates benefits obtained by phase-transferring different types of NPs into salt-containing water over conventional processes that phase-transfer NPs to plain water. In all experiments, the oil used was hexane, surfactant used was AOT at 1.5 g/L and salt used was NaCl at 3 g/L, unless specified otherwise.

Table 2 summarizes the results of phase-transfer experiments carried out in plain water, and in salt containing water, featuring NPs of different compositions and shapes. Phase-transfer experiments were carried out as per the descriptions provided in Table 1 (Bagaria, et al., 2009). In all experiments for this section, the oil used was hexane, surfactant used was Aerosol OT (AOT) and salt used was sodium chloride (NaCl).

Phase-transfer was carried out at 85° C. All resulting NP dispersions were characterized by their "dispersion" and "functionality" attributes. Dispersion refers to the settling of NPs in time and was recorded visually or after centrifugation at 9000 rpm for 1 hour by UV measurements (where applicable). Functionality refers to measurable physical properties that are specific to a type of NP, such as photoluminescence etc.

Figure 8:
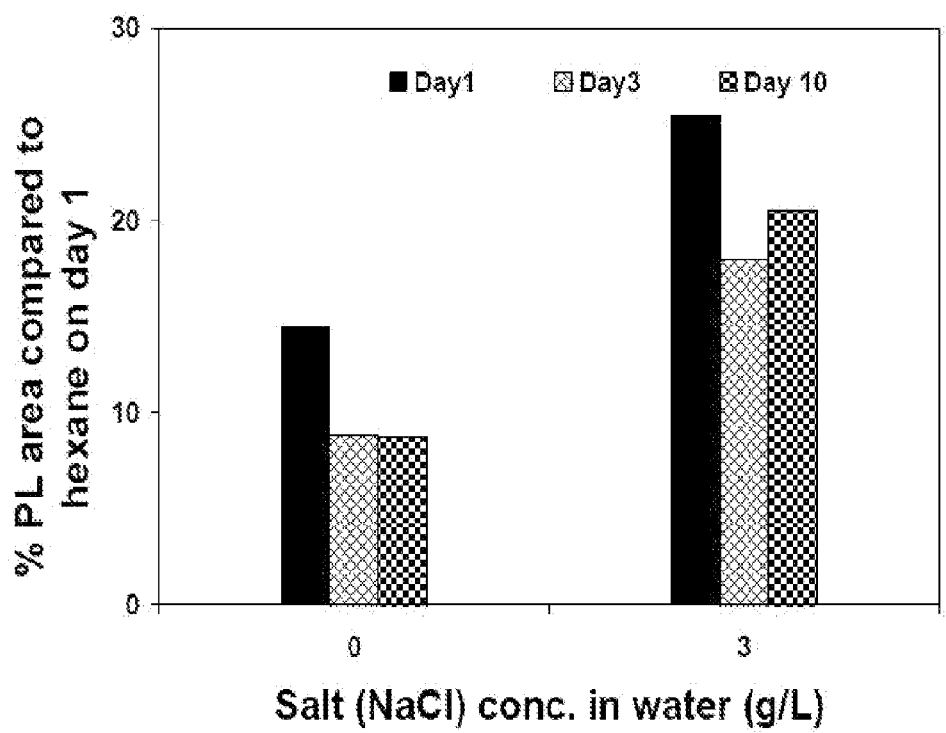
FIG. 8: % PL of CdSe/ZnS core-shell particles as a function of time, when transferred from hexane to water containing different levels of salt concentration (Salt=NaCl, Surfactant=AOT).

Inorganic semiconductor NPs (CdSe) have a characteristic property called fluorescence, wherein nanoparticles upon exposure to UV light, emits light in the visible region (appears orange/red/green etc.). Photoluminescence (PL) is the quantitative measure of fluorescence recorded by a fluorometer that was used to differentiate between NP dispersions of CdSe, when phase-transferred to plain water and water containing salt. CdSe is available in different shapes such as spheres, tetrapods and concentric spheres (CdSe/ZnS core-shell), whose dispersibility in plain water, and in water containing salt were also characterized by PL measurements (FIGS. 2,3 and FIGS. 5-8). Retention in PL of CdSe dispersions prepared in plain water and in water containing salt was investigated as a function of time for QDs (FIG. 3), tetrapods (FIG. 6) and core-shell particles (FIG. 8). All time studies of PL are reported as a fraction of original PL value of respective CdSe NP types in hexane, so as to have a reference point for comparison.

TABLE 2

Phase-transfer Results of different NP Types+

| NP Type | NP Shape | Phase-transfer in Water | | Phase-transfer in Salt-Containing Water | |
| --- | --- | --- | --- | --- | --- |
| | | Forms Dispersion? | Retains PL* in solution? | Forms Dispersion? | Retains PL in solution? |
| Inorganic Semiconductor NPs (CdSe) | Spheres (FIGS. 2, 3) | Yes, but a significant fraction of NPs crash out upon centrifugation | No, poor PL | Yes, NPs retained in solution upon centrifugation | Yes |
| | Tetrapods (FIGS. 5, 6) | Yes, but a significant fraction of NPs crash out upon centrifugation | No, poor PL | Yes, most NPs retained in solution upon centrifugation | Yes |
| | Core-Shell CdSe—ZnS Spheres (FIGS. 7, 8) | Yes, but a significant fraction of NPs crash out upon centrifugation | No, poor PL | Yes, most NPs retained in solution upon centrifugation | Yes |

TABLE 2-continued

Phase-transfer Results of different NP Types+

| NP Type | NP Shape | Phase-transfer in Water | | Phase-transfer in Salt-Containing Water | |
|---|---|---|---|---|---|
| | | Forms Dispersion? | Retains PL* in solution? | Forms Dispersion? | Retains PL in solution? |
| Organic NPs ($C_{60}$/Bucky Balls) | Spheres (FIG. 9) | No, significant fraction of NPs stick to stirrer/glass vial | Not applicable | Yes, most NPs phase-transferred and retained in solution upon centrifugation | Not applicable |
| Inorganic Metal NPs (Au) | Spheres (FIG. 10) | Yes, but significant fraction of NPs crash out upon centrifugation | Not applicable | Yes, most NPs retained in solution upon centrifugation | Not applicable |
| Inorganic Metal Oxide NPs (Iron Oxide) | Spheres (FIG. 11) | Yes, but a significant fraction of NPs crash out upon centrifugation | Not applicable | Yes, most NPs retained in solution upon centrifugation | Not applicable |
| Inorganic Oxide NP (Tungsten Oxide) | Nanorods (Data not shown) | No, significant fraction of NPs stick to stirrer/glass vial | Not applicable | Yes, most NPs phase-transferred and retained in solution upon centrifugation | Not applicable |

Figure 9:
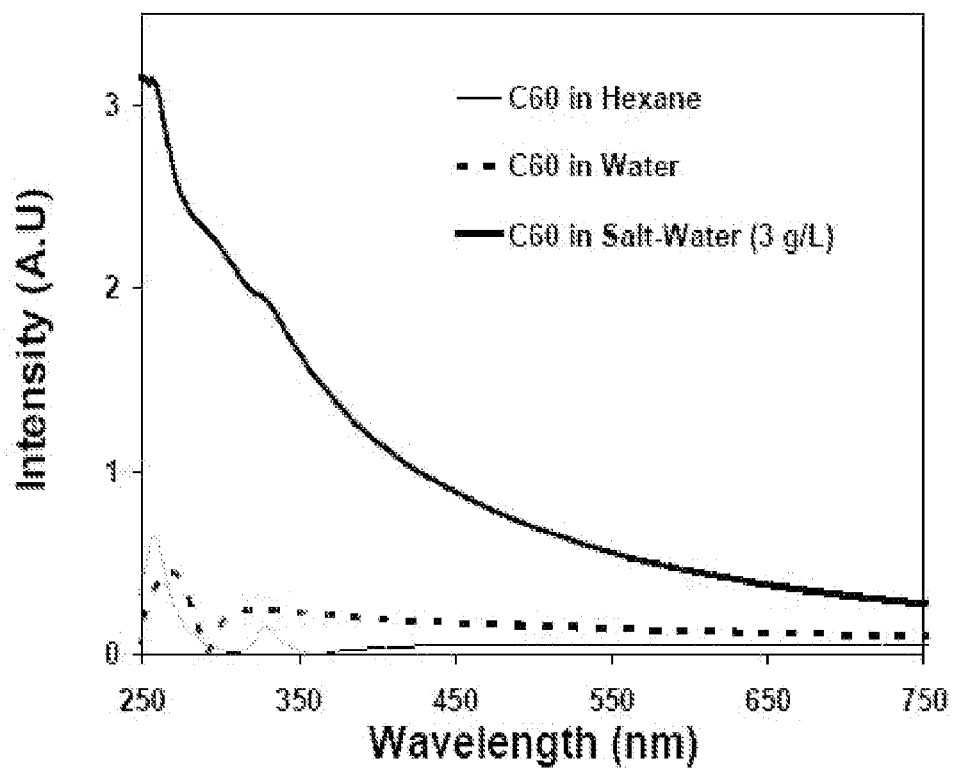
FIG. 9: UV-Vis absorbance spectra of $C_{60}$/Bucky balls transferred from hexane to water containing different levels of salt concentration (Salt=NaCl, Surfactant=AOT).

+All NPs were phase transferred from hexane using the surfactant AOT at 1.5 g/L. The salt used in phase-transfer studies was NaCl at 3 g/L unless mentioned otherwise
*PL—Photoluminescence Organic NP ($C_{60}$) transferred to plain water and to water containing salt was characterized by UV spectroscopy (FIG. 9). Visual inspection showed that phase-transfer of $C_{60}$ to water that did not contain salt was a near transparent solution while that transferred to water containing salt had a light grayish/pink color. It is noteworthy that in the former case, a lot of $C_{60}$ particles were stuck to the magnetic stirrer rod and the glass walls of reaction vials after phase-transfer, while when transferred with salt, this was not observed. Absorbance value is an indicator to the quantity of material present suggesting superior phase-transfer of $C_{60}$ nanoparticles in water containing salt.

Figure 10:
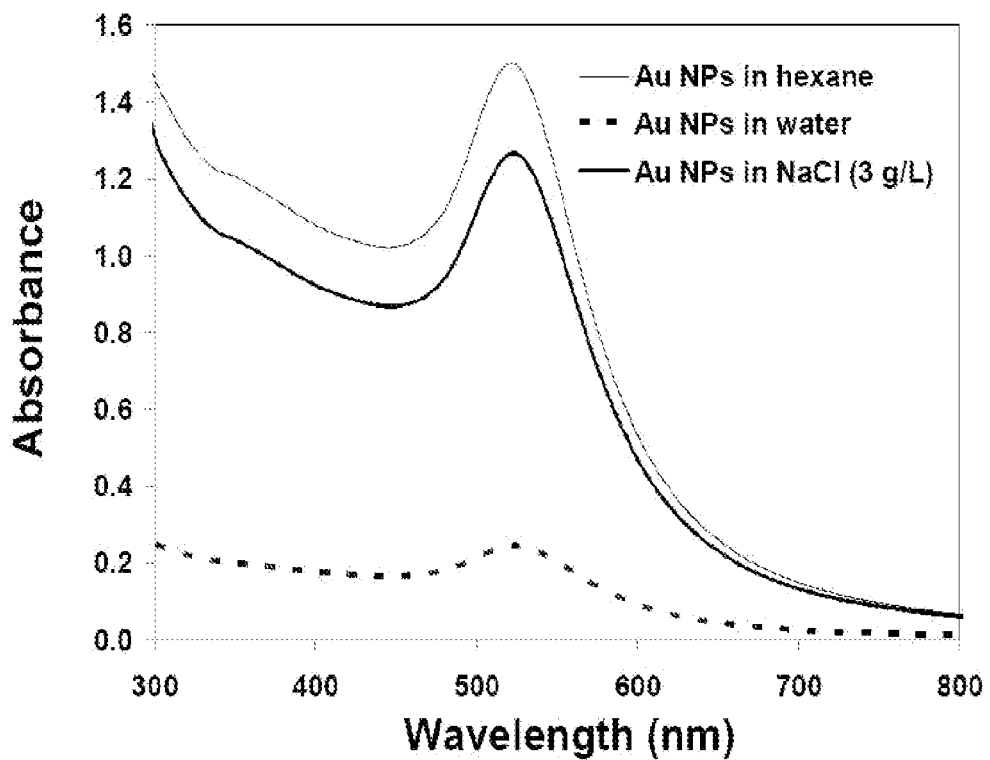
FIG. 10: UV-Vis absorption spectra of Gold (Au) NPs transferred from hexane to water containing different levels of salt concentration (Salt=NaCl Surfactant=AOT).
Figure 11:
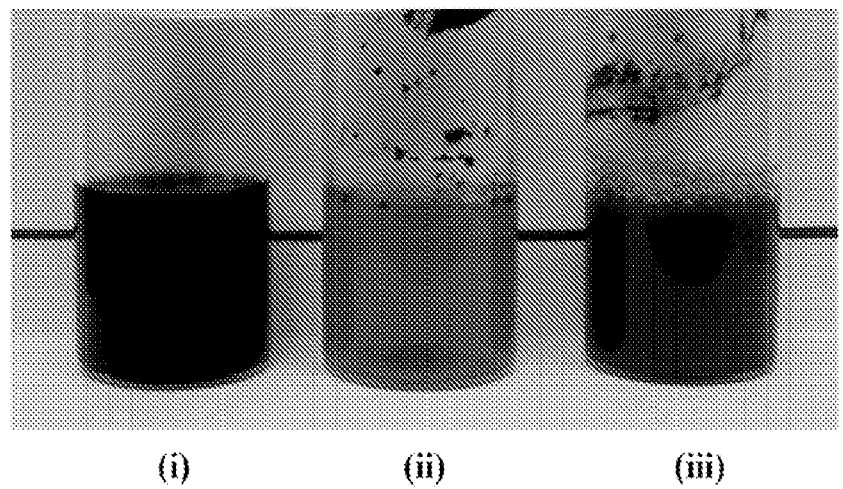
FIG. 11: Iron-oxide NPs (i) in hexane, (ii) phase-transferred to plain water and (iii) phase-transferred into 3 g/L NaCl.

Inorganic gold NPs (Au) transferred to water plain water and to water containing salt was characterized by UV spectroscopy (FIG. 10). Visual inspection showed that phase-transfer of Au to plain water was a near transparent solution while that transferred to water containing salt had a distinct pink color (data not shown, see Bagaria et al. 2009). As in the case of $C_{60}$ phase-transfer, many Au particles stuck to the magnetic stirrer rod and the glass walls when phase transferred in plain water, while with salt this was not observed. Absorbance peaks is an indicator to the quantity of material present, suggesting superior phase-transfer of Au nanoparticles in water containing salt.

Visual inspection of phase-transferred inorganic metal-oxide NPs (iron-oxide spheres) also showed that the fraction of NPs transferred from oil to water was higher in salt-containing water (FIG. 11) as evidenced by the darker colored NP dispersion.

Example 2

Figure 12:
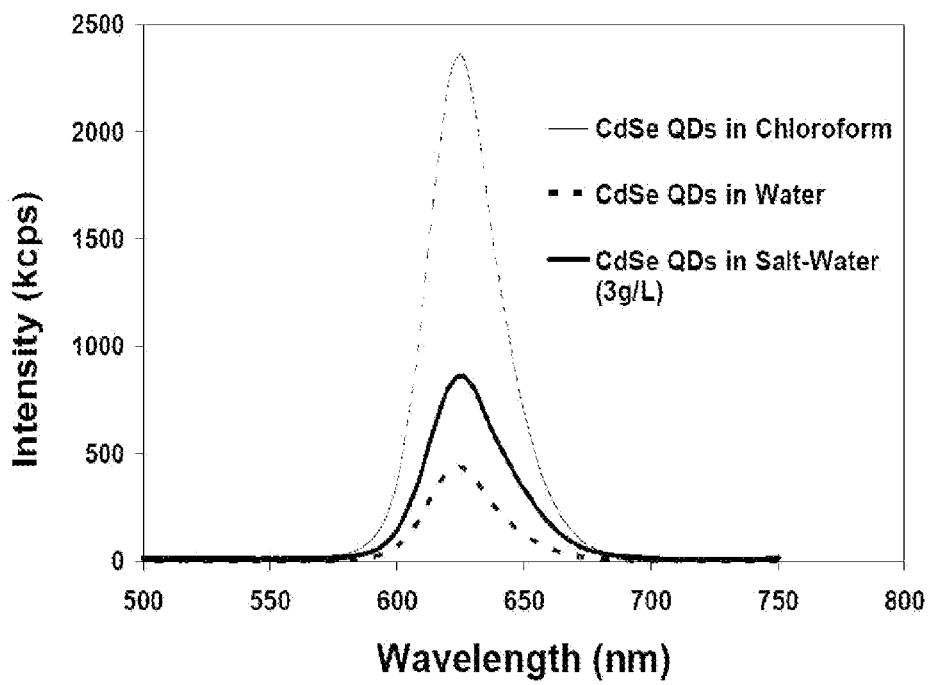
FIG. 12: PL spectra of spherical CdSe QDs, transferred from chloroform to water containing different levels of salt concentration (Salt=NaCl at 3 g/L, Surfactant=AOT).

Table 3 summarizes the results of phase-transfer experiments carried out in plain water with no salt, and in salt-containing water, featuring oils that are non-polar in nature such as hexane and polar oils such as chloroform. Phase-transfer experiments were carried out as per the descriptions provided in Table 1 (Baragia et al., 2009). In all experiments for this section, the surfactant used was AOT, salt used was NaCl at 3 g/L and the NPs phase-transferred were spherical CdSe QDs. Phase-transfer was carried out at 85° C. PL measurements were used to characterize the dispersions (FIG. 12). The PL of CdSe QDs phase transferred from chloroform to salt-containing water was higher than that of CdSe QDs phase transferred to plain water. Thus, the benefits of dispersing NPs in salt-water is independent of the oil that initially stores the NPs.

TABLE 3

Phase-transfer Results of CdSe QDs from Different Oils+

| | Phase-transfer in Water | | Phase-transfer in Salt Solution (NaCl) | |
|---|---|---|---|---|
| Oil | CdSe QD Disperses? | Retains PL* in solution? | CdSe QD Disperses? | Retains PL* in solution? |
| Hexane (FIG. 2) | Yes, but significant fraction of NPs crash out upon centrifugation | No | Yes, most NPs retained in solution upon centrifugation | Yes |

TABLE 3-continued

Phase-transfer Results of CdSe QDs from Different Oils[+]

| Oil | Phase-transfer in Water | | Phase-transfer in Salt Solution (NaCl) | |
|---|---|---|---|---|
| | CdSe QD Disperses? | Retains PL[*] in solution? | CdSe QD Disperses? | Retains PL[*] in solution? |
| Chloroform (FIG. 12) | Yes, but significant traction of NPs crash out upon centrifugation | No | Yes, most NPs retained in solution upon centrifugation | Yes |

[+]The surfactant used was AOT at 1.5 g/L, NPs used was CdSe QDs and salt used was NaCl at 3 g/L.
[*]PL: Photoluminescence Example 3

Figure 13:
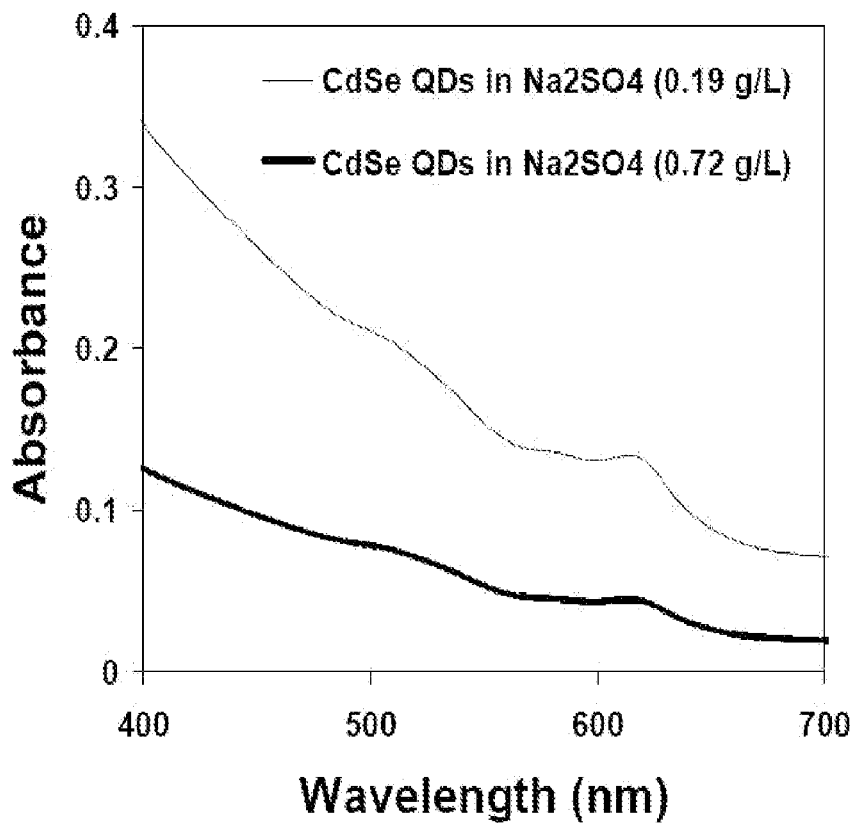
FIG. 13: UV and PL spectra of CdSe transferred from hexane to water containing sodium sulfate ($Na_2SO_4$). (Surfactant=AOT).
Figure 14:
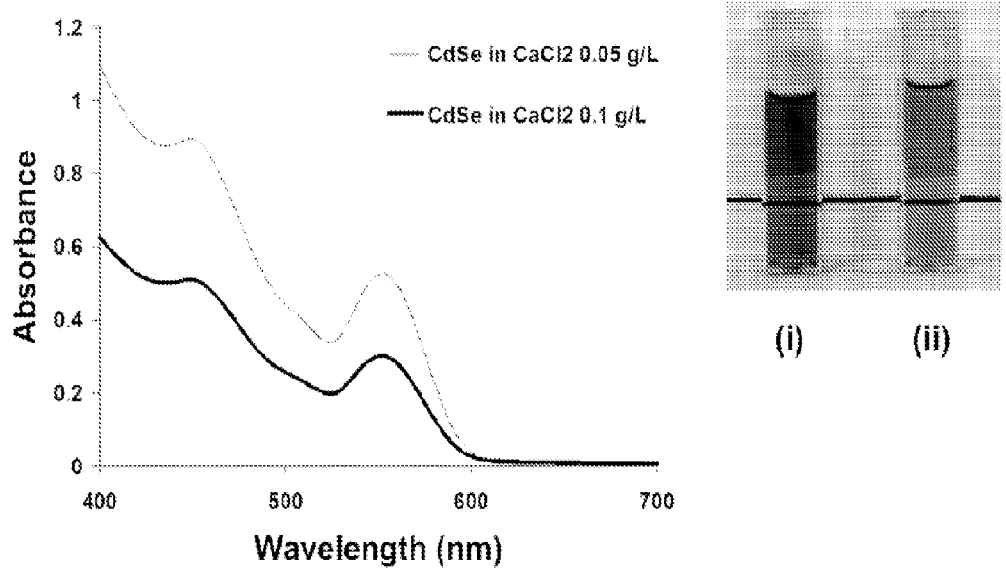
FIG. 14: UV-Vis spectra of CdSe NPs transferred from hexane to water containing $CaCl_2$ (surfactant=AOT). CdSe spherical QDs phase transferred into $CaCl_2$ solution at (i) 0.05 g/L and (ii) 0.1 g/L. Photographs taken under regular white light.
Figure 15:
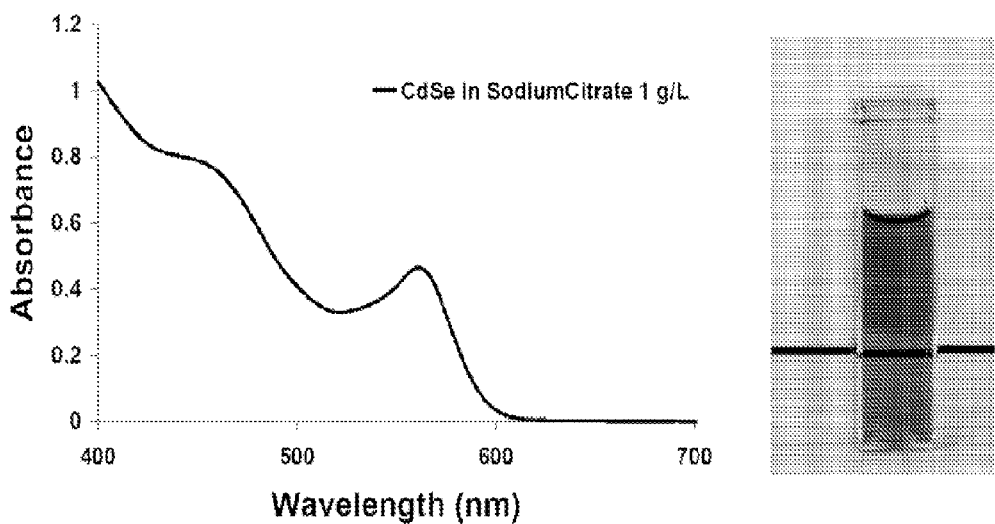
FIG. 15: UV-Vis spectra and photograph (under white light) of CdSe NPs transferred from hexane to water containing 1.0 g/L of sodium citrate (surfactant=AOT).
Figure 21:
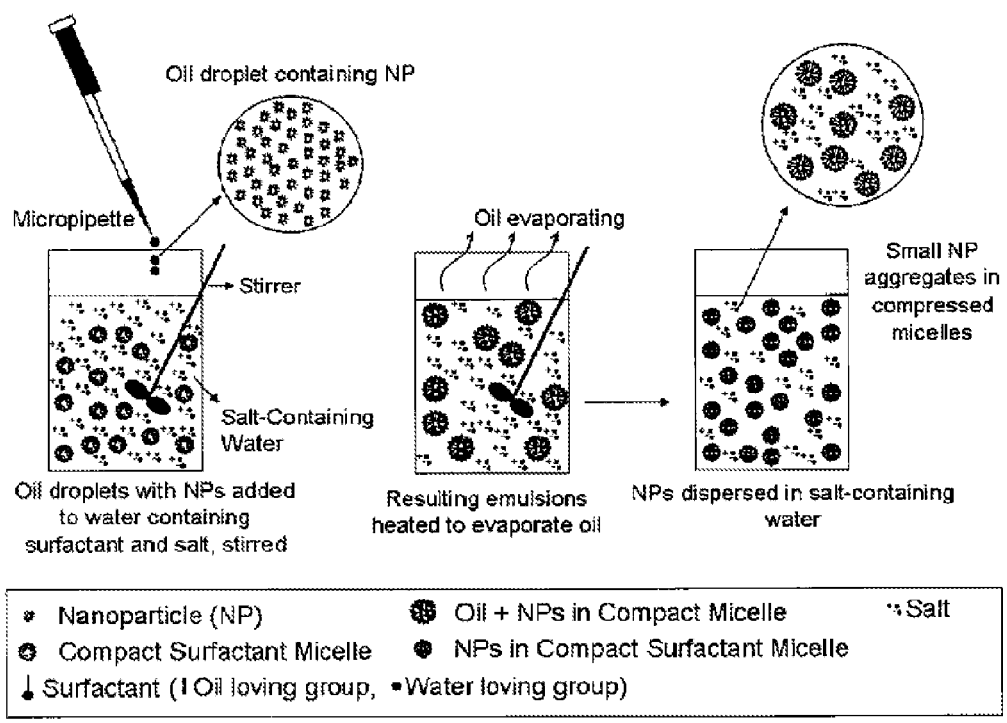
FIG. 21: Schematic 2 displays the inventive method of phase-transferring NPs from oil to salt water.

Table 4 summarizes the results of phase-transfer experiments carried out in water with salts other than sodium chloride—namely sodium sulfate ($Na_2SO_4$, FIG. 13), calcium chloride ($CaCl_2$, FIG. 14) and sodium citrate ($Na_3Citrate$, FIG. 15). Phase-transfer experiments were carried out as per the description provided in Schematic 2, shown in FIG. 21. In all experiments for this section, the oil used was hexane, the surfactant used was AOT and the NPs phase-transferred were spherical CdSe QDs. Sodium sulfate solutions were prepared at concentrations of 0.19, 0.38 and 0.72 g/L. Levels of $CaCl_2$ were fixed at 0.05 and 0.1 g/L, whereas the study with $Na_3Citrate$ was done at 1 g/L. Phase-transfer was carried out at 85° C. UV and/or PL measurements were used to characterize the dispersions. A control run for the experiment is described as a footnote of Table 4.

TABLE 4

Phase-transfer Results of CdSe Using Different Salts[+]

| Salt | Salt Concentration | Disperses NPs? | Retains PL[*] of NPs? |
|---|---|---|---|
| Sodium sulfate ($Na_2SO_4$) (FIG. 13) | 0.19 g/L | Yes, most NPs retained in solution upon centrifugation | Yes |
| | 0.38 g/L | Yes, most NPs retained in solution upon centrifugation | Yes |
| | 0.72 g/L | Yes, most NPs retained in solution upon centrifugation | Yes |
| Calcium chloride ($CaCl_2$) (FIG. 14) | 0.05 g/L | Yes, most NPs retained in solution upon centrifugation | Not measured |
| | 0.1 g/L | Yes, but most NPs crash out upon centrifugation | Not measured |
| Sodium citrate ($Na_3Citrate$) (FIG. 15) | 1 g/L | Yes, most NPs retained in solution upon centrifugation | Not measured |

[+]All NPs were phase-transferred from hexane to salt-containing water, using AOT at 1.5 g/L.

Example 4

Figure 16:
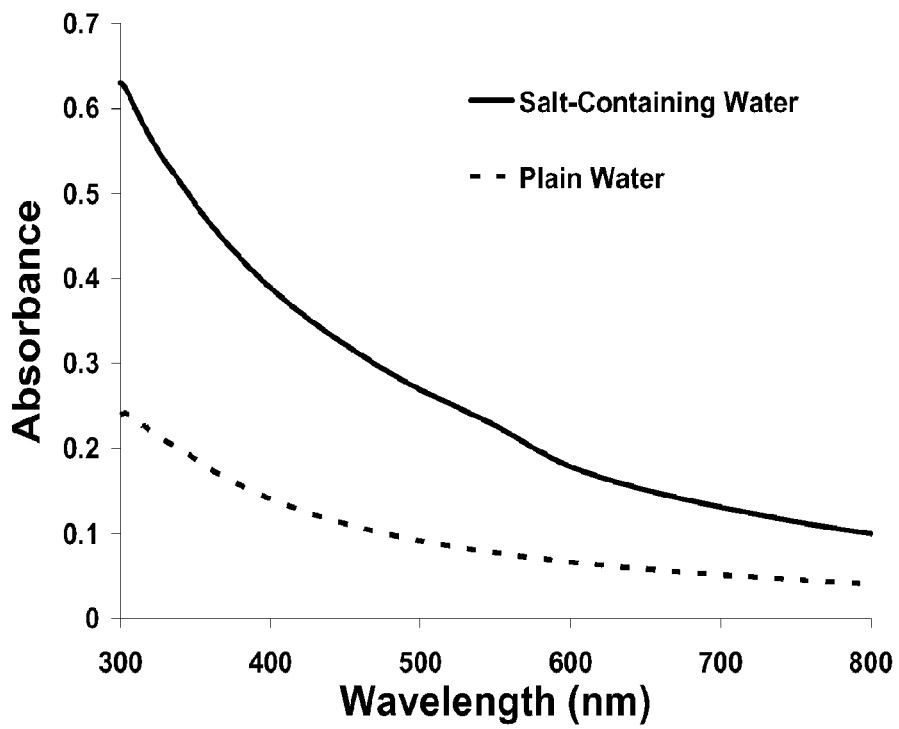
FIG. 16: UV-Vis spectra of CdSe NPs phase transferred in water and 3 g/L NaCl solution with DDAB as the surfactant Both samples were centrifuged at 9000 rpm for one hour after centrifugation.
Figure 17:
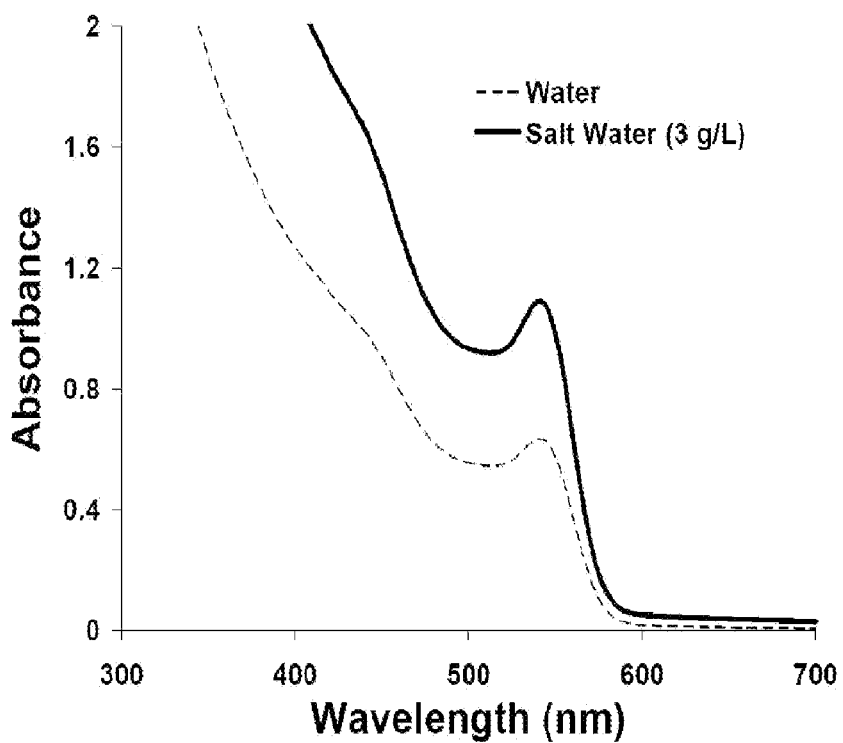
FIG. 17: UV-Vis spectra of CdSe NPs transferred from hexane to water containing NaCl at 3 g/L using a surfactant blend of AOT (anionic) and Polystep C-M4S (non-ionic) surfactant.

Table 5 summarizes the results of phase transfer experiments carried out through the use of different surfactant types, namely CTAB (cationic), DDAB (cationic) and a mixture of AOT (anionic) and Polystep C-M4S ($C_9$-Phenyl-$EO_4$—$SO_3$—$Na^+$: non-ionic) surfactants. For all the experiments, the oil used was hexane and the salt used was NaCl. Upon phase-transfer, the samples were centrifuged at 9000 rpm for 1 hour and the supernatant NPs were retained. As shown by UV-Vis spectra and/or photographs in FIG. 1 (CTAB), FIG. 16 (DDAB) and FIG. 17 (AOT and Polystep C-M4S), the phase-transfer of CdSe NPs using the above surfactants was found to be superior in the presence of salt over plain water.

TABLE 5

Phase Transfer of NPs using different surfactants[+]

| Surfactant | Phase-transfer in Water | | Phase Transfer in salt-containing water | |
|---|---|---|---|---|
| | Forms dispersion in solution? | Retains PL[*]? | Forms dispersion in solution? | Retains PL[*]? |
| CTAB (1.5 g/L) (FIG. 1) | Yes, but most NPs crash out upon centrifugation | No | Yes, most NPs are retained in solution upon centrifugation | Yes |
| DDAB (1.5 g/L) (FIG. 16) | Yes, but most NPs crash out upon centrifugation | Not measured | Yes, most NPs are retained in solution upon centrifugation | Not measured |
| AOT + Polystep C-M4S (Total 1.5 g/L) (FIG. 17) | Yes, but most NPs crash out upon centrifugation | Not measured | Yes, most NPs are retained in solution upon centrifugation | Not measured |

[+]All phase transfer experiments were carried out from hexane to plain or salt-containing water using AOT as surfactant at 1.5 g/L. CdSe QDs were the NPs phase transferred and NaCl was the salt used. Unless mentioned otherwise, the concentration of NaCl was 3 g/L as the surfactant and with CdSe QDs as NPs.
[*]PL = photoluminescence Example 5

Figure 18:
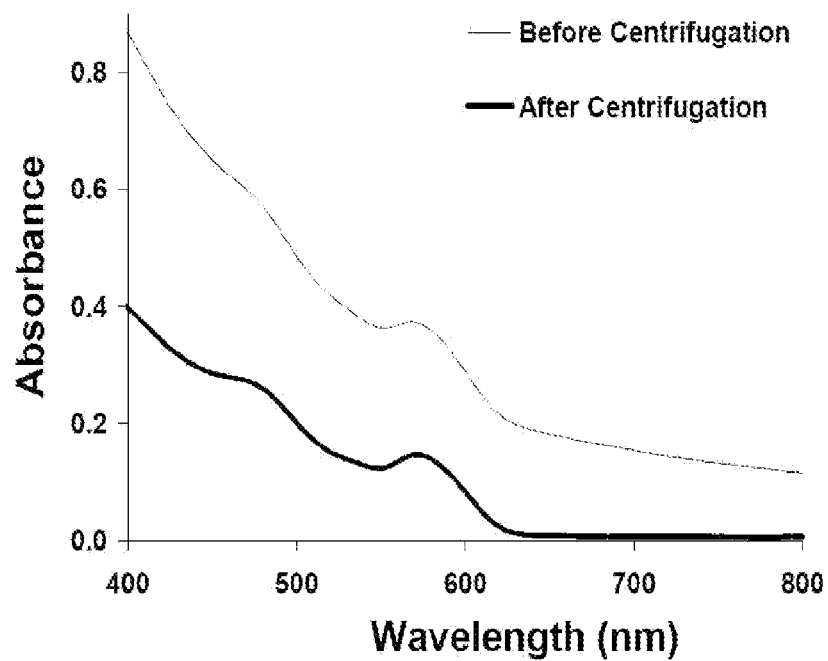
FIG. 18: UV-Vis spectra of CdSe NPs in 3 g/L NaCl before and after centrifugation showing the removal of scattering components in phase-transferred solutions.

After NPs are phase transferred with the surfactant AOT, the dispersion may appear turbid due to liquid crystalline surfactant aggregates. The presence of these aggregates results in an overall high level of absorbance due to scattering, as shown in the UV-Vis spectra of CdSe NPs in FIG. 2. These aggregates can be removed by centrifugation as evidenced by the near-zero absorbance at higher wavelengths in the curve indicated as 'after centrifugation' (FIG. 18). The photographs of CdSe NPs clearly show the removal of the turbidity from the dispersion upon centrifugation leading to clear CdSe dispersions (refer to Bagaria et al. 2009 for color images).

Example 6

Figure 19:
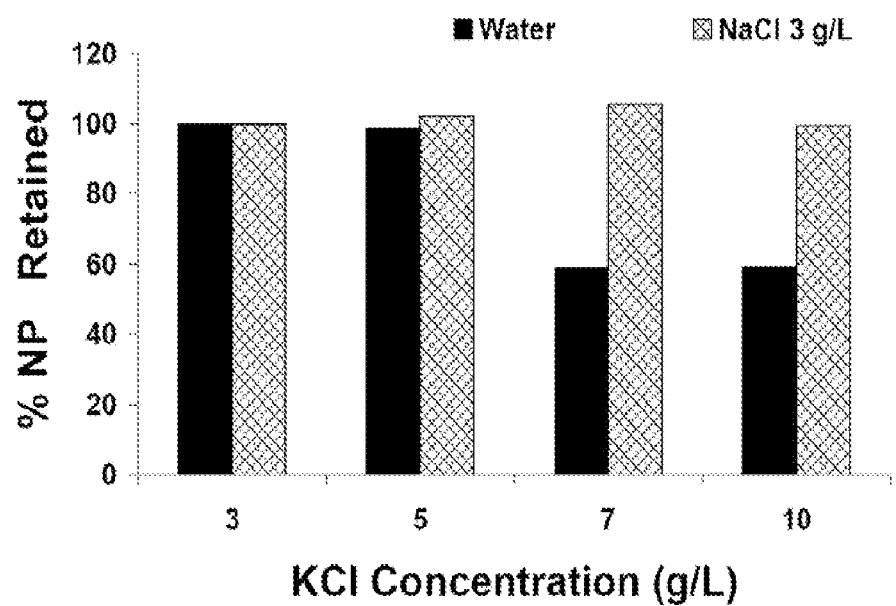
FIG. 19: Stability of 3 nm CdSe NPs in KCl solution after transfer from hexane to water or 3 g/L NaCl solution using AOT-Polystep C-M4S surfactant blend.
Figure 20:
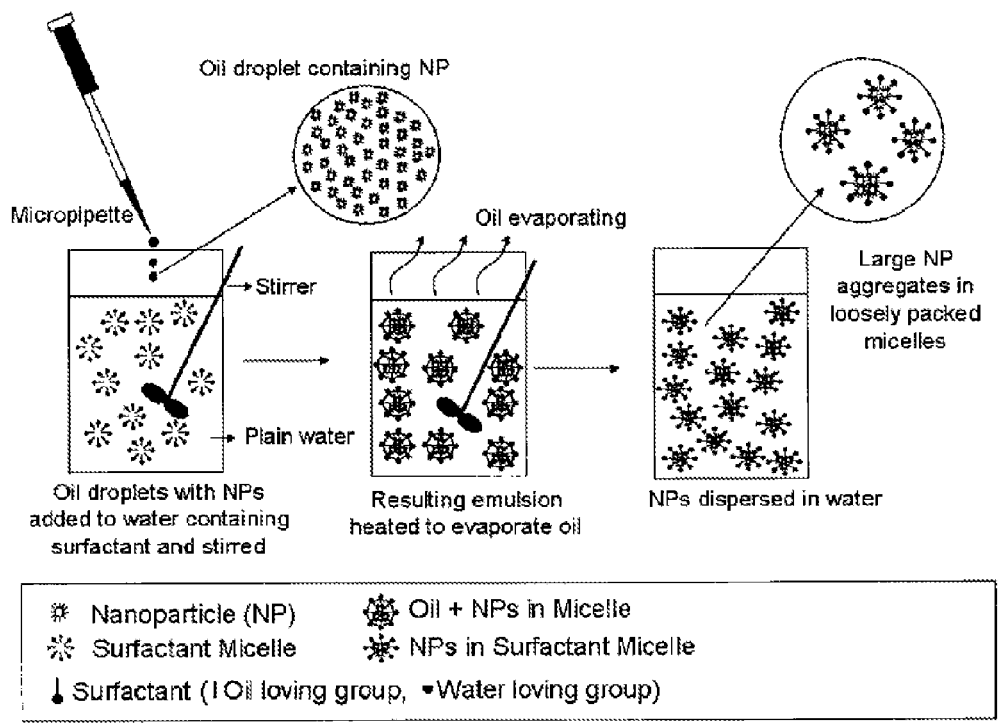
FIG. 20: Schematic 1 displays the conventional method of phase-transferring NPs from oil to plain water.

The stability of NPs to high ionic strength solutions is higher, when NPs are phase transferred using surfactants in salt-water over plain-water. FIG. 19 depicts the percentage of NPs retained in high ionic strength solutions of KCl, after solutions of CdSe QDs that were phase transferred in plain water and salt (NaCl) containing water, were added to varying levels of ionic-strength of KCl. A blend of AOT and Polystep C-M4S surfactants was used to phase transfer NPs from hexane to plain or salt-containing water. Upon phase transfer, the NPs were centrifuged at 9000 rpm for 1 hour to remove non-dispersed NPs and liquid crystalline aggregates of AOT. Prior to stability studies in high ionic strength solutions of KCl, the concentration of NP solutions phase-transferred in salt-water was adjusted to match NP concentrations in plain water by diluting with brine and measuring UV-absorbance. For stability studies in ionic strength solutions, KCl solutions were prepared at varying levels of concentration. NPs in salt-containing water and plain water were added (dilution 1 in 5) such that the final KCl concentration ranged between 3 to 10 g/L. The solutions were centrifuged at 9000 rpm for 1 hour after which UV measurements were made on the supernatant solutions. The percentage NP retained is the ratio of concentration of NPs (measured from absorbance values at the first exciton—542 nm) contained in a specified ionic strength solution of KCl after centrifugation to the concentration of NPs contained in the lowest ionic strength solution (3 g/L KCl) after centrifugation, as a reference point. As a note, this reference point was selected since there was no apparent difference in NP concentrations as measured by UV, before and after the centrifugation step. From FIG. 19, it is apparent that NPs stabilized by compact micelles in salt-containing solutions had a higher tolerance to ionic strength when compared with NPs stabilized by loosely packed micelles in plain water.

In conclusion, the efficacy of the new phase-transfer process is herein demonstrated to be useful across many different NP, oil, salt and surfactant types and this methodology is broadly applicable.

The following references are incorporated herein in their entirety:
1. Tang, Z. Y., Kotov, N. A., One-dimensional assemblies of nanoparticles: Preparation, properties, and promise. *Advanced Materials* 2005, 17, (8), 951-962.
2. Shipway, A. N., et al., Nanoparticle arrays on surfaces for electronic, optical, and sensor applications. *ChemPhysChem* 2000, 1, (1), 18-52.
3. Bruchez, M., et al., Semiconductor nanocrystals as fluorescent biological labels. *Science* 1998, 281, (5385), 2013-2016.
4. Michalet, X., et al, Quantum dots for live cells, in vivo imaging, and diagnostics. *Science* 2005, 307, (5709), 538-544.
5. Dobson, J., Gene therapy progress and prospects: magnetic nanoparticle-based gene delivery. *Gene Therapy* 2006, 13, (4), 283-287.
6. Giepmans, B. N. G. et al., Correlated light and electron microscopic imaging of multiple endogenous proteins using Quantum dots. *Nature Methods* 2005, 2, (10), 743-749.
7. Aldana, J., et al., Photochemical instability of CdSe nanocrystals coated by hydrophilic thiols. *Journal of the American Chemical Society* 2001, 123, (36), 8844-8850.
8. Talapin, D. V., et al., Highly luminescent monodisperse CdSe and CdSe/ZnS nanocrystals synthesized in a hexadecylamine-trioctylphosphine oxide-trioctylphospine mixture. *Nano Letters* 2001, 1, (4), 207-211.
9. Fan, H. Y., et al., Surfactant-assisted synthesis of water-soluble and biocompatible semiconductor quantum dot micelles. *Nano Letters* 2005, 5, (4), 645-648.
10. Fan, H. Y., et al., Self-assembly of ordered, robust, three-dimensional gold nanocrystal/silica arrays. *Science* 2004, 304, (5670), 567-571.
11. Dubertret, B., et al., In vivo imaging of quantum dots encapsulated in phospholipid micelles. *Science* 2002, 298, (5599), 1759-1762.
12. Li, H. B., et al., Gemini surfactant for fluorescent and stable quantum dots in aqueous solution. *Nanotechnology* 2007, 18, (20).
13. Rosen, M. J., *Surfactants and Interfacial Phenomena*. John Wiley & Sons: New York, 1989.
14. Bagaria, H. G., et al., In preparation. 2009.
15. Zhang, Y. J., Cremer, P. S., Interactions between macromolecules and ions: the Hofmeister series. *Current Opinion in Chemical Biology* 2006, 10, (6), 658-663.
16. Hiemenz, P. C., Rajagopalan, R., *Principles of Colloid and Surface Chemistry*. 3 ed.; Marcel Dekker: New York, 1997.

What is claimed is:

1. A method of converting nanoparticles (NPs) in oil to NPs in aqueous suspension comprising:
    a) dissolving NPs into an oil having a boiling point lower than that of water to provide an oil suspension of NPs;
    b) preparing a surfactant solution in water containing a salting-in electrolyte such that the concentration of the surfactant is above the critical micellar concentration; and
    c) adding the NP containing oil blend of step a) to the surfactant solution and stirring the resulting dispersion to form an aqueous suspension of NPs.

2. The method of claim 1, wherein the salting-in electrolyte is selected from the group consisting of urea, guanidium chloride and 1-4 dioxane.

* * * * *